US012791151B2

(12) United States Patent
Nelson et al.

(10) Patent No.: US 12,791,151 B2
(45) Date of Patent: Nov. 10, 2026

(54) VAPOR PLUG LOCKING MECHANISM

(71) Applicant: Cryoport, Inc., Brentwood, TN (US)

(72) Inventors: David Nelson, Irvine, CA (US); James Wilbourn, Costa Mesa, CA (US)

(73) Assignee: Cryoport, Inc., Brentwood, TN (US)

( * ) Notice: Subject to any disclaimer, the term of this patent is extended or adjusted under 35 U.S.C. 154(b) by 0 days.

(21) Appl. No.: 18/812,682

(22) Filed: Aug. 22, 2024

(65) Prior Publication Data

US 2026/0055852 A1 Feb. 26, 2026

(51) Int. Cl.
*F17C 13/00* (2006.01)

(52) U.S. Cl.
CPC .... *F17C 13/006* (2013.01); *F17C 2201/0128* (2013.01); *F17C 2201/056* (2013.01); *F17C 2205/0165* (2013.01); *F17C 2205/0305* (2013.01); *F17C 2205/0311* (2013.01); *F17C 2223/0161* (2013.01)

(58) Field of Classification Search
CPC ............ F17C 13/006; F17C 2201/0128; F17C 2201/056; F17C 2205/0165; F17C 2205/0305; F17C 2205/0311; F17C 2223/0161; F17C 2270/0509; F17C 13/06; B65D 45/327; B65D 45/322; B65D 45/32; B65D 45/00; B65D 45/345; B65D 45/34; B65D 39/16
USPC ..... 220/560.04, 560.05, 238, 793, 794, 318, 220/322, 326; 215/320, 317, 359
See application file for complete search history.

(56) References Cited

U.S. PATENT DOCUMENTS

| | | | |
|---|---|---|---|
| 4,480,762 A | 11/1984 | Thomas | |
| 5,251,770 A | 10/1993 | Bartley et al. | |
| 6,439,409 B1 | 8/2002 | Dressel et al. | |
| 2008/0000870 A1* | 1/2008 | Lopez Alvarez | A61J 1/1443 215/249 |
| 2019/0276201 A1* | 9/2019 | French | B65D 50/043 |
| 2022/0185553 A1* | 6/2022 | Savage | A45D 40/265 |
| 2022/0204218 A1 | 6/2022 | Bores | |
| 2024/0076117 A1* | 3/2024 | Wallin | B65D 85/30 |
| 2024/0083637 A1* | 3/2024 | Ziegenfelder | B65D 43/0212 |
| 2024/0093839 A1* | 3/2024 | Lee | F17C 13/002 |

FOREIGN PATENT DOCUMENTS

JP 2021-075305 A 5/2021

OTHER PUBLICATIONS

PCT; International Search Report and Written Opinion dated Dec. 26, 2025 in PCT Application No. PCT/US2025/042856.

* cited by examiner

*Primary Examiner* — Laura E. Parker
(74) *Attorney, Agent, or Firm* — Snell & Wilmer L.L.P.

(57) ABSTRACT

A system, method and apparatus, and/or device is provided for securing a vapor plug on a cryogenic storage vessel. The vapor plug locking mechanism includes a vapor plug and a cryogenic storage vessel. The vapor plug has a first interlocking feature. The cryogenic storage vessel has an opening and a neck ring around the opening. The neck ring has a second interlocking feature. The first interlocking feature is configured to selectively overlap the second interlocking feature, wherein the two features selectably engage to retain the vapor plug to the cryogenic storage vessel.

17 Claims, 7 Drawing Sheets

VAPOR PLUG LOCKING MECHANISM

BACKGROUND

1. Field

This specification relates to a system, device, or apparatus to secure a lid to a cryogenic storage vessel, such as a dewar.

2. Description of the Related Art

Cryogenic storage vessels, such as dewars, dry vapor shippers, or other vessels, vent gas vapor to prevent the buildup of pressure inside of the vessel, which could cause the vessel to fail. These cryogenic storage vessels may retain liquid nitrogen (or dry vapor) to produce a cryogenic temperature in the vessel, also called a dewar. The cryogenic storage vessel is vacuum insulated and traps vapors to maintain extreme cold temperatures of approximately −195° C.

To maintain the cold temperature and prevent the releasing of the contents inside, the cryogenic storage vessel has a vapor plug, cork, lid or other capping mechanism that inserts on the neck of the cryogenic storage vessel. The vapor plug or lid keeps the temperature within a desired range and keeps the contents inside. The vapor plug is designed to allow gases to escape from the cryogenic storage vessel. The vapor plug may move to allow the gas to escape, however a sudden jarring or movement of the cryogenic storage vessel may cause the vapor plug to dislodge from the neck of the cryogenic storage vessel. Thus, if the vapor plug is not retained within the dry vapor shipper and the vapor plug is dislodged during transit, thermal transmission will increase within the cryogenic storage vessel and the cryogenic storage vessel will warm more quickly and/or the contents of the cryogenic storage vessel may spill out.

Traditionally, the vapor plug of a cryogenic storage vessels moves freely to allow the venting of gasses. And so, when there are sudden movements during transit, the vapor plug may be dislodged from within the neck of the cryogenic storage vessel. This results in thermal transmission and increases the temperature within cryogenic storage vessel causing the contents to warm more quickly. Accordingly, there is a need for a system, device or apparatus to retain the vapor plug on the cryogenic storage system.

SUMMARY

A vapor plug locking mechanism is provided. The mechanism may include a neck ring. The mechanism may include a vapor plug. The neck ring may include a cylindrical wall to encircle a neck of a storage container. The cylindrical wall is receivable onto the neck of the storage container. The neck ring may include a protruding annular boss extending radially outwardly from the cylindrical wall and defining a discontinuous edge configured to be selectably engaged with the vapor plug. The vapor plug may be insertable into the neck of the storage container. The vapor plug may include a flexible interference flange that is bendable in response to manipulation of a handle. The flexible interference flange may include a lip extending radially inwardly from the vapor plug toward a center of the cylindrical wall of the neck ring to selectably engage with the discontinuous edge of the protruding annular boss of the neck ring.

One or more further aspects may be provided. In various instances, the cylindrical wall of the neck ring encircles the neck. The protruding annular boss may include a guidance ramp including a cantilevered inclined plane disposed annularly about at least a portion of the cylindrical wall and extending away from the cylindrical wall and defining an undercut space between the cylindrical wall and the guidance ramp of the protruding annular boss. The vapor plug may include a plate side wall having a cylindrical flange positionable radially outward of and encircling the neck ring.

The flexible interference flange may include the lip engageable against the protruding annular boss and extending at least partially into the undercut space to selectably retain the vapor plug insertably in the neck by an interference fit of the lip against the protruding annular boss. The lip may include a protrusion extending annularly from the flexible interference flange inwardly toward a central longitudinal axis of the vapor plug. The lip may have or be an inwardly extending boss extending from the flexible interference flange to selectably engage with the protruding annular boss to selectably retain the vapor plug insertably in the neck. The flexible interference flange may include a handle cantilevered from the flexible interference flange to manipulate the flexible interference flange to selectably disengage the inwardly extending boss from the protruding annular boss. The handle may include a vertical radius arm cantilevered from a radially outward surface of the plate side wall and extending parallel to a central longitudinal axis of the vapor plug. The vertical radius arm may include a curved end. The curved end connects to a horizontal radius arm extending perpendicularly from the vertical radius arm.

In various instances, the flexible interference flange is U-shaped. In various instances, the neck ring includes a ledge. The ledge may include a boss having a cross-sectional profile matching that of an end of the neck and positionable atop the end of the neck. The ledge may provide an abutting face that abuts a portion of the vapor plug. The neck ring may include a channel defined through the ledge and configured to receive a wire for passage from inside the storage container, past the vapor plug, and out of the storage container when the vapor plug is installed in place.

A cryogenic storage vessel system is provided. The system may include a dewar. The system may include a vapor plug insertable into a neck of the dewar to at least partially seal the dewar. The dewar may include a neck ring. The neck ring may include a cylindrical wall to encircle the neck of the dewar, wherein the cylindrical wall is receivable onto the neck of the dewar. The neck ring may include a protruding annular boss extending radially outwardly from the cylindrical wall and defining a discontinuous edge configured to be selectably engaged with the vapor plug. The vapor plug may include a flexible interference flange that is bendable in response to manipulation of a handle. The flexible interference flange may include a lip extending radially inwardly from the vapor plug toward a center of the cylindrical wall of the neck ring to selectably engage with the discontinuous edge of the protruding annular boss of the neck ring.

In various embodiments, the vapor plug includes a plate side wall having a cylindrical flange positionable radially outward of and encircling the neck ring, the flexible interference flange comprising a portion of the cylindrical flange. A further flexible interference flange may be disposed opposite the flexible interference flange, separated from the flexible interference flange along the plate side wall. The flexible interference flange may include the lip engageable against the protruding annular boss and extending at least partially into an undercut space to selectably retain the vapor plug insertably in the neck of the dewar by an interference fit of the lip against the protruding annular boss. The lip may include an inwardly extending boss extending from the flexible interference flange to selectably engage with the protruding annular boss to selectably retain the vapor plug insertably in the neck.

A vapor plug apparatus is provided. The apparatus may include a flexible interference flange. The flexible interference flange may be bendable in response to manipulation of a handle. The flexible interference flange may include a lip extending radially inwardly from the vapor plug apparatus toward a center of a cylindrical wall of a neck ring of a dewar to selectably engage with a discontinuous edge of a protruding annular boss of the neck ring of the dewar. The lip may be selectably engageable against the protruding annular boss of the neck ring of the dewar and extending at least partially into an undercut to selectably retain the vapor plug apparatus insertably in the neck ring of the dewar by an interference fit of the lip against the protruding annular boss. The apparatus may include a guidance ramp disposed adjacent to the lip to allow the vapor plug apparatus to selectably engage with the neck ring of the dewar. The apparatus may include a further flexible interference flange is disposed opposite the flexible interference flange, separated from the flexible interference flange. The apparatus may include a handle cantilevered from the flexible interference flange to manipulate the flexible interference flange to selectably disengage the lip from the protruding annular boss. The handle may include a vertical radius arm cantilevered from a radially outward surface of a plate side wall of the vapor plug apparatus and extending parallel to a central longitudinal axis of the vapor plug apparatus. A vertical radius arm may include a curved end that connects to a horizontal radius arm extending perpendicularly from the vertical radius arm.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

Figure 1:
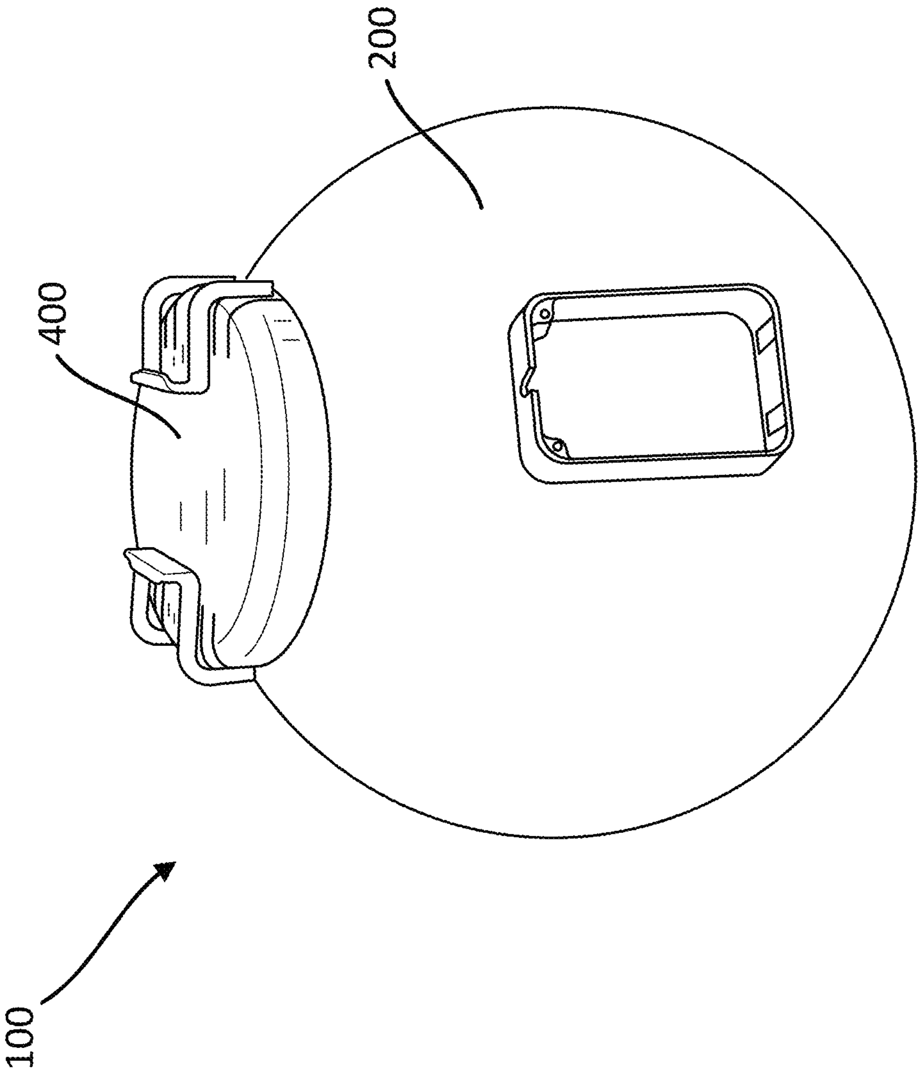
FIG. 1 shows a perspective view an exemplary cryogenic storage vessel comprising a vapor plug locking mechanism according to an aspect of the invention.

Disclosed herein are systems, apparatuses, and devices for transporting and storing material maintained at cryogenic or other lower temperatures by a cooling agent. The cooling agent may be a liquid or gas, such as liquid nitrogen. The system, apparatus or device may include a vapor plug locking mechanism that locks, holds or otherwise is configured to retain the vapor plug in the neck of a cryogenic storage vessel. A locking mechanism may be used to partially seal a vapor plug to a dewar. The inner vessel of the dewar may have a neck portion. The neck portion may have an opening that receives the material in the dewar and stores the material in the inner vessel of the dewar. The dewar may be a double-walled and vacuum-insulated container that is used to transport materials at cryogenic temperatures. The dewar may have an inner wall that is lined with an absorbent material and an outer wall, which forms an inner and outer vessel.

A vapor plug or other lid may be used to partially seal a lid to the body of the dewar. The vapor plug may be attached to allow gas to release as pressure and/or temperature changes in the dewar. The vapor plug may at least partially seal the lid to the dewar to prevent the payload from escaping and may allow the pressure of the dewar to equalize by releasing gas. The vapor plug may be retained so that it does not extend excessively from the dewar. For instance, a dewar that is spherical may rotate inside a housing and have a vapor plug that must stay sufficiently inside the dewar that it does not contact the housing and interfere with rotation. The vapor plug, by releasing gas as the pressure increases, assists in maintaining an appropriate internal environment of the dewar. Further, by reducing the amount of liquid or gas that evaporates, the vapor plug also limits the amount of warm air that is pulled in to replace the evaporated liquid or gas, which prolongs the amount of time that the dewar can maintain the cryogenic temperatures.

The lid or vapor plug may attach to the neck of the dewar. The vapor plug and neck of the dewar may have a locking mechanism. The locking mechanism on the vapor plug may be configured to attach to the locking mechanism of the dewar. The locking mechanism, in various embodiments, may include a neck ring on the neck of the dewar. The neck ring may be attached to the neck of the dewar. The neck ring may have an annular flange. The vapor plug may also have a corresponding elements, such as a corresponding annular flange or partial annular flange. As used herein, an annular flange may include a body that is extending radially away from, or extending radially inward toward, a circumferential face of the neck, such as to form a structure with at least one portion that is an annulus, or a partial annulus (e.g., an incomplete annulus having a length of less than 2 pi radians). The flange of the vapor plug may be designed to interlock with corresponding features of the flange on the neck of the dewar. The corresponding flanges may nest, overlap, abut, or otherwise engage in at least a partial interference fit or contact along at least a portion of the corresponding flanges. For instance, an annular flange of the neck ring may be received into an interference fit with a portion of the flange of the lid, so that the annular flange of the neck ring is retained in mechanical communication with the flange of the lid.

With reference to FIG. 1, in various embodiments, a cryogenic storage vessel 100 may comprise a vapor plug 400 and a dewar 200. In various embodiments, the vapor plug 400 may partially seal the dewar 200. That is, the vapor plug 400 allows the liquid or gas to escape the dewar 200 to at least partially equalize the pressure within the dewar 200 relative to an external pressure, but may also, obstruct and/or reduce the amount of liquid or gas that escapes to limit evaporation and limit warm gas from entering into the dewar 200. This maintains the cryogenic temperatures within the dewar 200 to allow for continued cryogenic storage of the material stored within the dewar 200. The vapor plug 400 may be retained in sufficient obstructing relation to the opening of the dewar 200 that it does not extend outward into a contacting relationship with a surrounding housing of the dewar 200. This is particularly important for dewars that rotate or move in a housing (such as a spherical dewar) and have a vapor plug that is desired to remain in non-contacting relationship with the housing so that the rotation is free.

Figure 2:
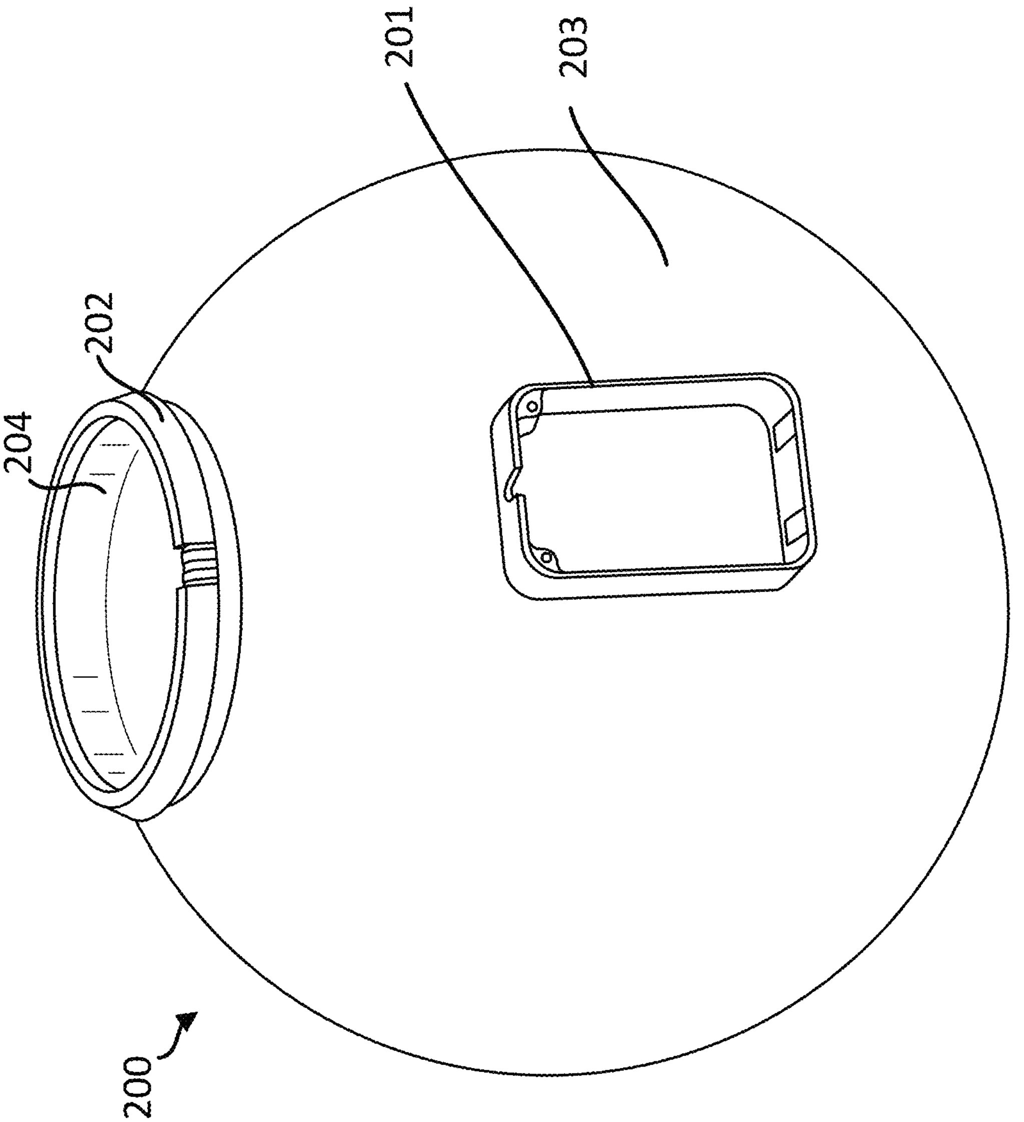
FIG. 2 shows a perspective view of a cryogenic shipping container including an exemplary neck according to an aspect of the invention.

With reference to FIG. 2, in various embodiments, a dewar 200 may include a base 203. The base 203 is a primary body of the dewar 200. In various embodiments, the cryogenic storage vessel 100 may include a neck ring 202 that protrudes from the top of the base 203. The neck ring 202 may attach to or be integral with the base 203 using an appropriate manner for strength, heat transfer, or industry practices. The neck ring 202 may be a separate component or part of the base 203. The neck ring 202 may be fabricated using plastic, metal, or composite. The neck ring 202 may define an aperture corresponding to an opening of the neck 204. In various embodiments, the neck ring 202 defines an aperture with an inner diameter greater than or equal to an outer diameter of the neck 204, so that the neck ring 202 is received in mechanical communication with the neck 204. In yet further instances, the neck ring 202 defines a channel and receives the neck 204 inside a channel of the neck ring 202, so that aspects of the neck ring extend both radially inwardly and radially outwardly of the neck 204. The aperture of the neck ring 202 allows payload materials to be inserted into the base 203 through the opening of the neck 204. As mentioned, the neck ring 202 may be disposed annularly about a neck 204 of the base 203. Stated differently, the neck ring 202 may be a ring-shaped structure encircling a neck 204, which may be cylindric structure.

Figure 3:
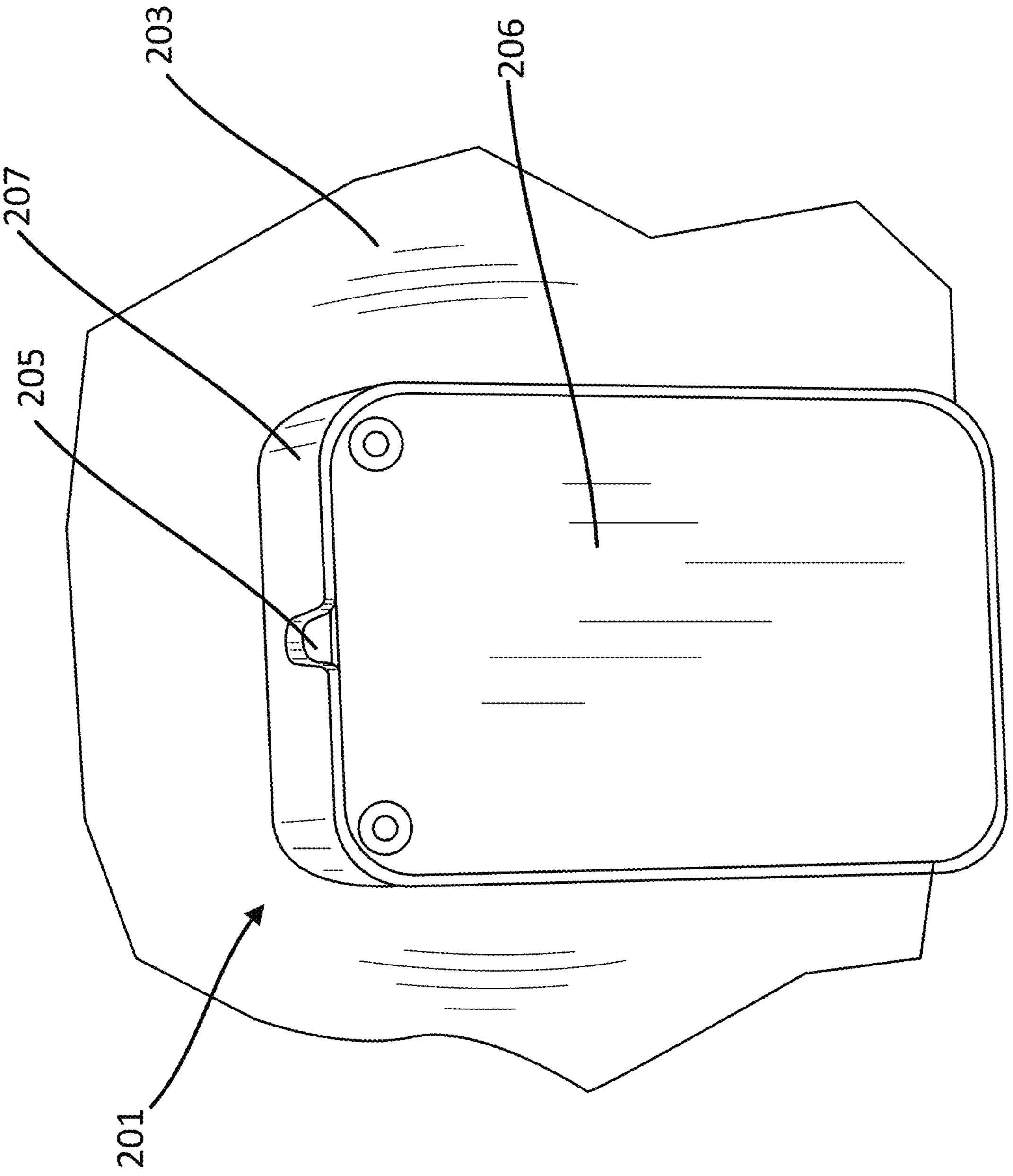
FIG. 3 shows a close-up view of an exemplary electronics enclosure comprising a housing, cover, and wireway.

With reference to FIGS. 2 and 3, the dewar 200 of the cryogenic storage vessel 100 may include an electronics enclosure 201. The electronics enclosure 201 comprises a protruding wall 207 extending away from a surface of the base 203 of the dewar 200, with the surface of the base 203 providing a floor of the electronics enclosure 201, and the protruding wall 207 providing surrounding sides of the electronics enclosure 201. In further instances, the electronics enclosure 201 has a floor that rests on the surface of the base 203, such as to provide a planar floor inside the electronics enclosure 201 attached to the curved surface of the base 203 of the dewar 200. A door 206 may be attached to the protruding wall 207 opposite the base 203 and provide a cover (e.g., a side opposite the floor) of the electronics enclosure 201. The electronics enclosure 201 is configured to store electronic hardware, such as a controller, data logger, transceiver, etc. to be used to monitor the contents contained in the dewar 200 of the cryogenic storage vessel 100. In various embodiments, the electronics enclosure 201 may adhere to the base 203 using an appropriate manner for strength, heat transfer, or industry practices. The electronics enclosure 201 may be a separate component or part of the base 203. The electronics enclosure 201 may be fabricated using plastic, metal, or composite. Thus, the electronics enclosure 201 may be adhered to or integrally formed with the base 203 of the dewar 200. The electronics enclosure 201 may be whatever size is desirable to house the appropriate electronics. In various embodiments, the electronics are operable to monitor an interior space of the dewar 200.

In example embodiments, the electronics enclosure 201 may contain a wire exit 205. The wire exit 205 provides a space for wires to pass into the electronics enclosure 201. The wires may pass into the opening of the cryogenic storage vessel 100 (FIG. 1) so that a sensor inside the cryogenic storage vessel 100 (FIG. 1) is in electrical communication with electronics inside the electronics enclosure 201. The wire exit 205 may comprise a channel defined through a portion of the electronics enclosure 201. For instance, the channel may be defined through the protruding wall 207.

Figure 4:
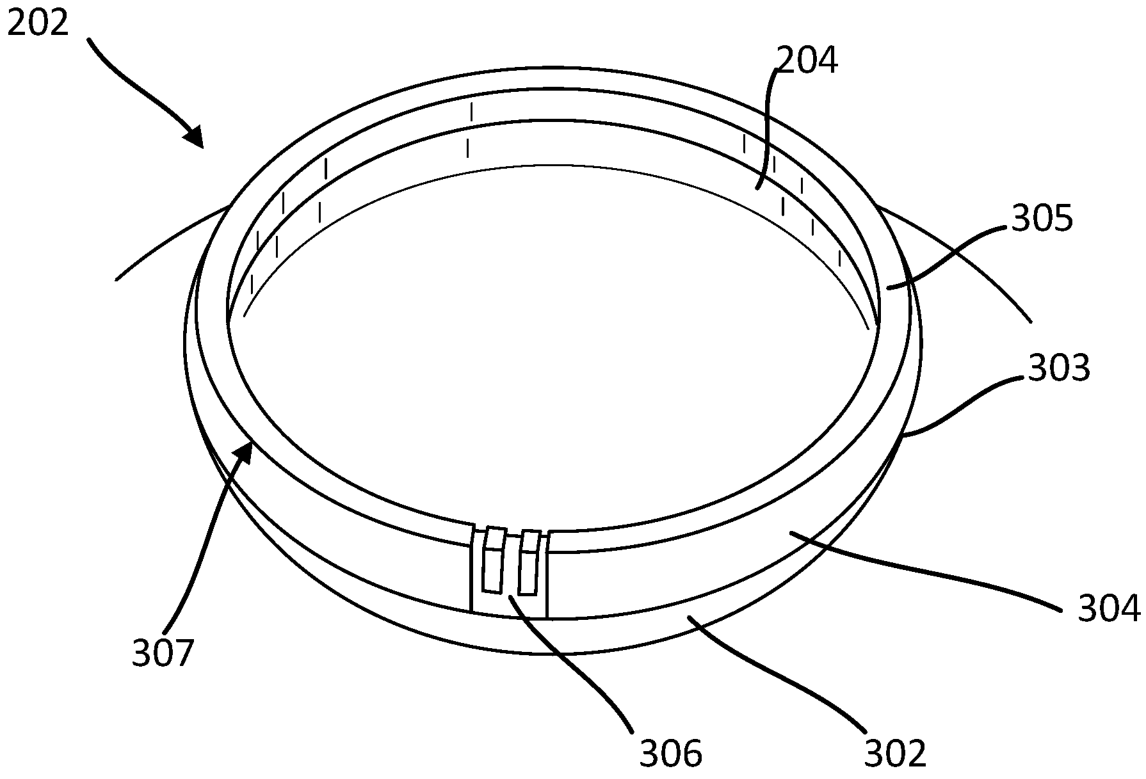
FIG. 4 shows a close-up view of an exemplary neck ring according to an aspect of the invention.
Figure 6:
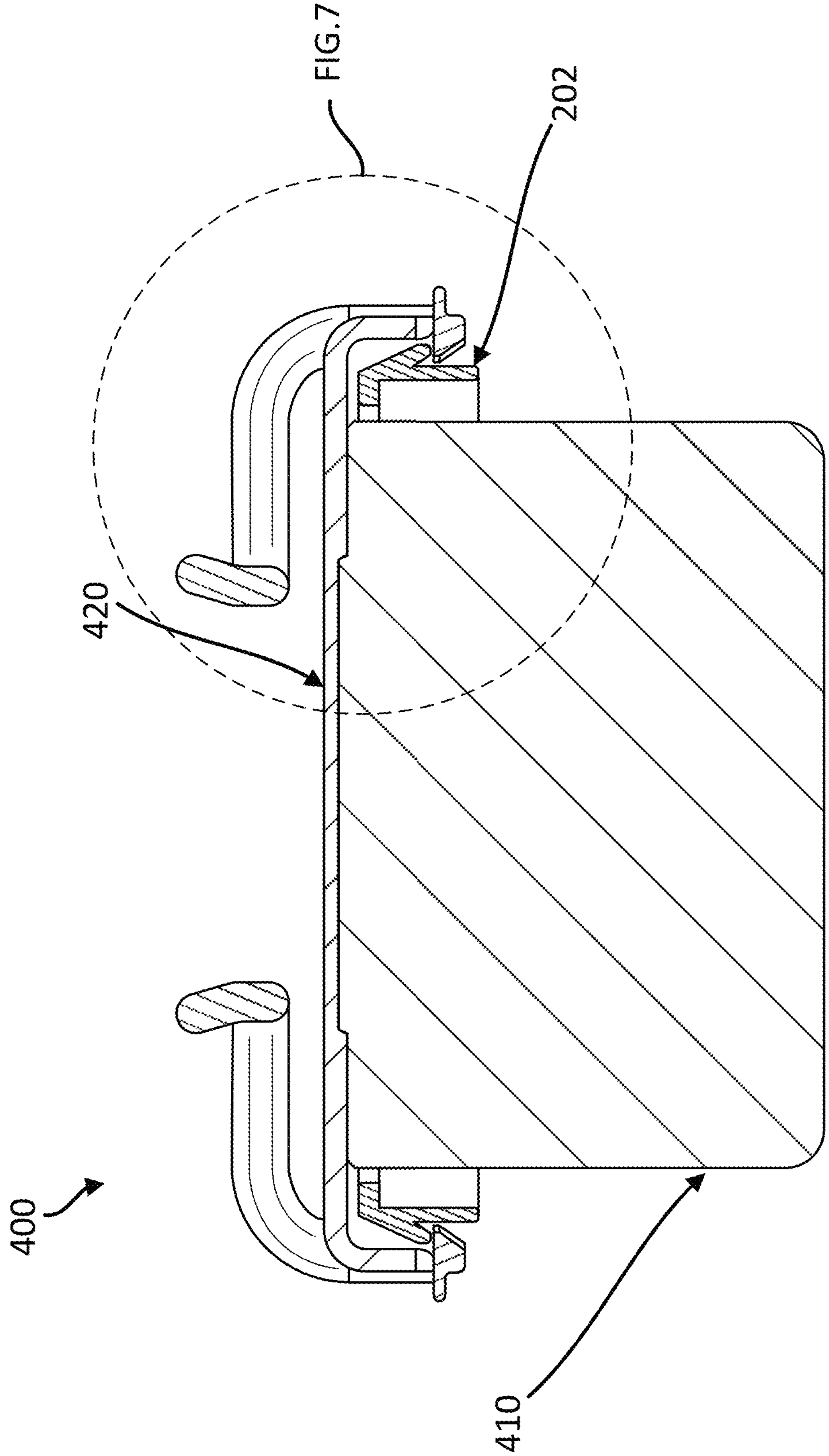
FIG. 6 shows a cross-sectional view of an exemplary vapor plug including the vapor plug locking mechanism according to an aspect of the invention.
Figure 7:
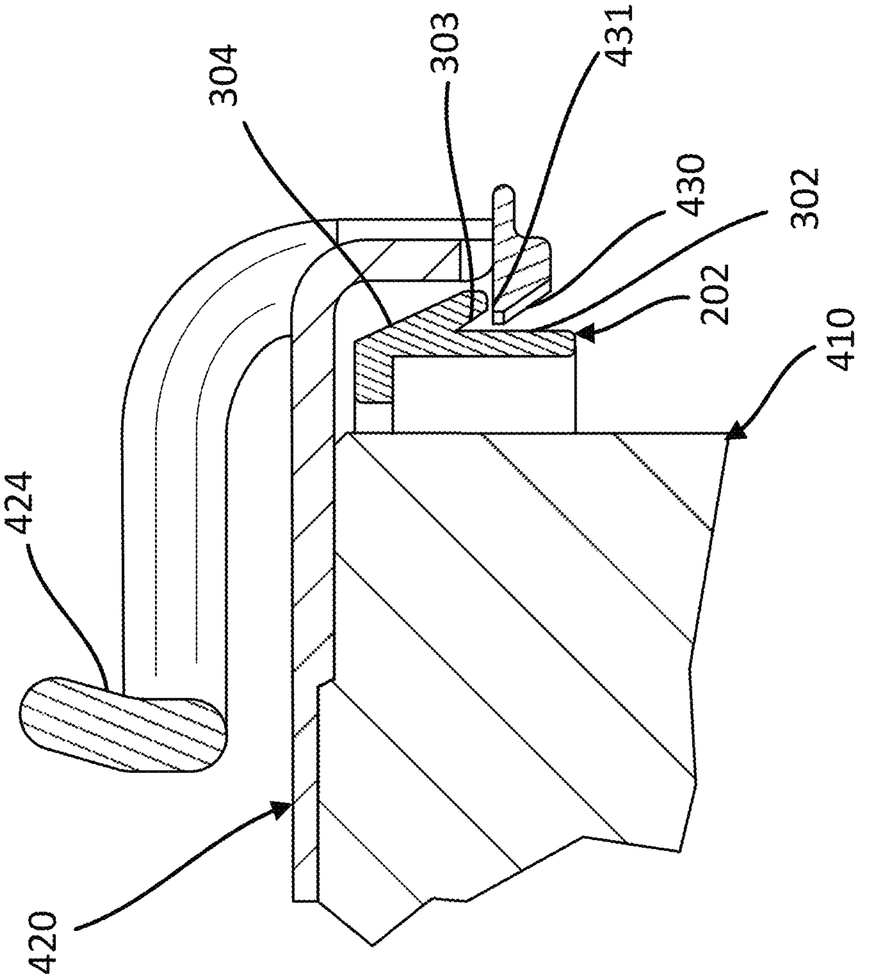
FIG. 7 shows a detailed view of the cross-sectional view of an exemplary vapor plug including the vapor plug locking mechanism according to an aspect of the invention.

With reference to FIGS. 4, 6, and 7, and as mentioned previously, neck ring 202 may include an aperture that aligns with an opening of a neck ring 202 and allows materials to be inserted into the base 203 (FIG. 2). The neck ring 202 may be fabricated using plastic, metal, or composite and adhered to (or formed integrally with) the base 203 (FIG. 2) using an appropriate manner for strength, heat transfer, or industry practices. In some example embodiments, the neck ring 202 may be part of the base 203 (FIG. 2). In example embodiments, the neck ring, may contain a cylindrical wall 302. When installed on an opening of a neck 204, the cylindrical wall 302 extends annularly at least a portion of the neck 204, encircling the neck 204. The cylindrical wall 302 has a length that extends upwardly with a central longitudinal axis parallel the central longitudinal axis of the neck ring 202. The neck ring may have a local thickening. The cylindrical wall 302 spaces an undercut 303 on the neck ring 202 a distance from the base 203.

The undercut 303 may comprise an edge, such as an abrupt change in a cross-sectional profile of the cylindrical wall 302. For instance, a local discontinuity wherein the cylindrical wall 302 thickens, or otherwise has a ledge 305 feature, may be provided. In various embodiments, an inclined planar flange (guidance ramp 304) cantilevers from the cylindrical wall 302 as a plane of an annular boss 307 outwardly away from the cylindrical wall 302 and toward the base 203, creating a cavity defined between the cylindrical wall 302 and the cantilevered inclined planar flange. In various embodiments, this cavity defined between the cylindrical wall 302 and the guidance ramp 304 comprises the undercut 303. Moreover, the undercut 303 may refer, at least in part, to a distal-most end of the cantilevered wall (e.g., the end farthest from the origin of the cantilever where the cantilever joins the cylindrical wall 302).

As mentioned, leading into the undercut 303 there may be a guidance ramp 304. The guidance ramp 304 provides a gradually increasing circumference from a top of the neck ring 202 toward the base 203 to the undercut 303.

In example embodiments, the neck ring 202 may contain a ledge 305. The ledge 305 comprises a boss having a cross-sectional profile matching that of the neck 204. Thus, the ledge 305 sits atop (e.g., at a distal-most end or stated differently, an end of the neck 204 farthest from the base 203). The ledge 305 provides a chamfer, flat area, or otherwise an abutting face that abuts a portion of the vapor plug 400 when the vapor plug 400 is installed into the dewar 200. The ledge 305 ameliorates any possible sharp edges between the opening and the guidance ramp 304.

The neck ring 202 may also include a channel 306 for electrical wires. The channel 306 comprises a groove or other depression defined in the neck ring 202. The channel 306 establishes a local discontinuity in a cross-section of the neck ring 202, and wires may be nested in the local discontinuity. For instance, one or more grooves may pass from an inner surface of the neck ring 202, which may be a surface radially most inward relative to a central longitudinal axis of the neck ring 202 to an outer surface of the neck ring 202, which may be a surface radially most outward relative to the central longitudinal axis of the neck ring 202. In various embodiments, the outer surface of the neck ring 202 is a surface radially most outward relative to the central longitudinal axis of the neck ring 202 at a chosen longitudinal station along the length (from base 203 to ledge 305) of the neck ring 202. In various embodiments, the channel 306 may further include a cutaway, depression, groove, or otherwise an aperture or region of material removal and may extend downwardly (from the ledge 305) toward the base 203 and provide clearance for the wires relative to the vapor plug when the vapor plug is installed. The channel 306 may be structured and arranged to ameliorate any interference fit of the wires or unwanted occlusion relative to the wires when a vapor plug is installed onto the neck ring 202. The channel 306 for electrical wires may be configured to be inline vertically with the electronics enclosure 201 (FIG. 3), and specifically, the wire exit 205 (FIG. 3) of the electronics enclosure 201 (FIG. 3) on the outside of the base 203. The channel 306 for electrical wires allows connections to be ran from the electronics enclosure 201 to the opening of the base 203 without concern that the wires will be compromised when the cryogenic storage vessel 100 is closed.

Figure 5:
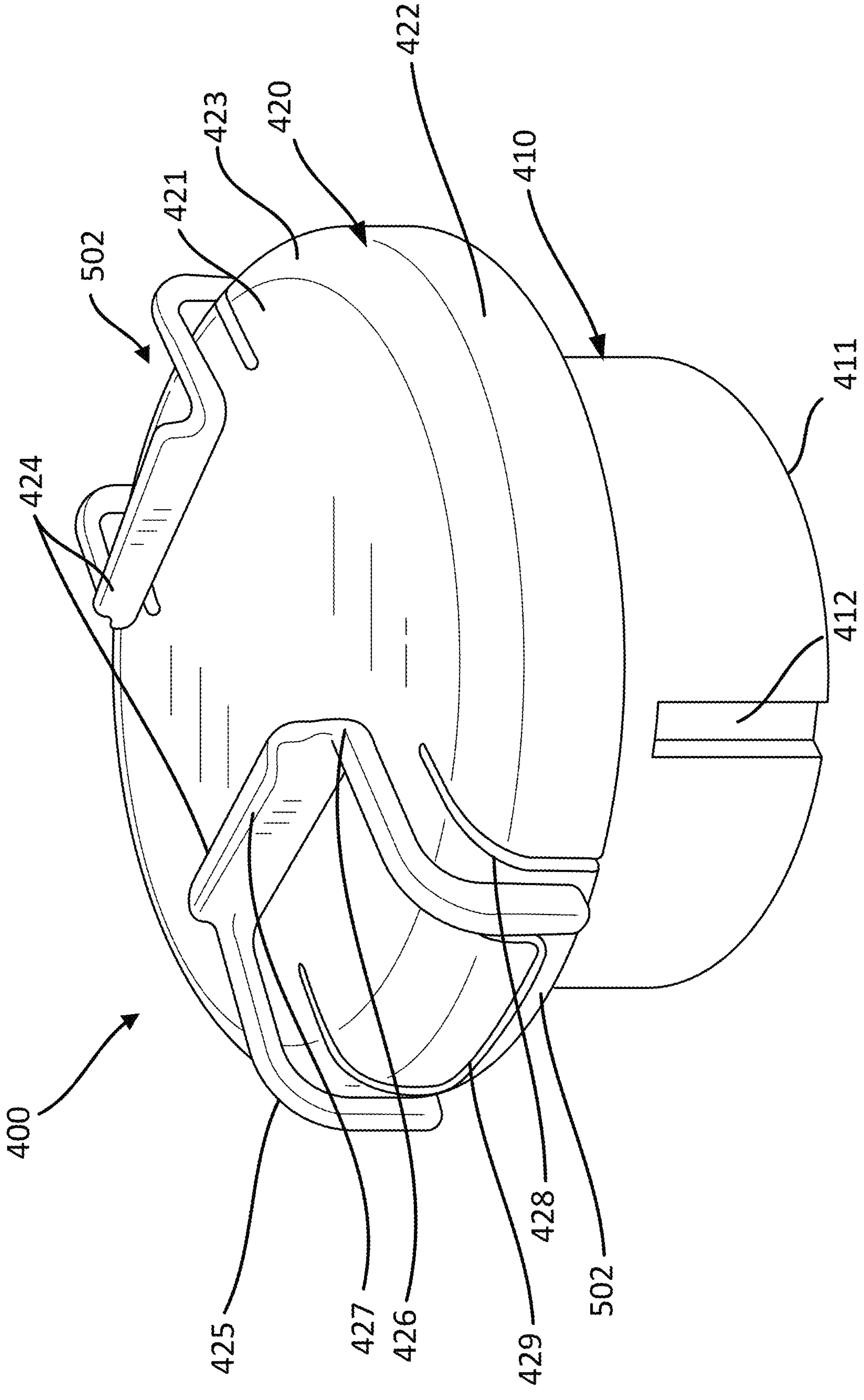
FIG. 5 shows the vapor plug according to an aspect of the invention.

With reference to FIG. 5, in various example embodiments, the vapor plug 400 may contain a cork bottom 410. The cork bottom 410 may be used to insulate the material that is in the base 203 when the vapor plug 400 in place on the cryogenic storage vessel 100. In various embodiments, the cork bottom 410 may comprise a radiused perimeter 411 to match the interior profile of the base 203 (FIG. 2) opening. The cork bottom 410 may contain a wireway 412 so that wires exiting the electronics enclosure 201 can enter the base 203 (FIG. 2) through the channel 306 (FIG. 4) and then through the wireway 412, so that the wires do not interfere with or occlude installation of the vapor plug (and particularly the cork bottom 410) into the neck 204 (FIG. 4). For instance, the wireway 412 may be aligned with the channel 306 (FIG. 4), so that wires passing from outside the base 203 (FIG. 2) enter into the channel 306 (FIG. 4) and then through the wireway 412.

The wireway 412 may comprise a cutaway, depression, groove, or otherwise an aperture or region of material removal extending along the cork bottom 410 parallel to a central longitudinal axis of the vapor plug 400 and/or neck 204 (FIG. 4). The wireway 412 may extend downwardly toward the base 203 and provide clearance for the wires relative to the vapor plug when the vapor plug is installed. The wireway 412 may be structured and arranged to ameliorate any interference fit of the wires or unwanted occlusion relative to the wires when a vapor plug is installed onto the neck ring 202 and the neck 204 (FIG. 4). The cork bottom 410 may be made of plastic, cork, insulating material or another material, or combinations of materials. The cork bottom 410 may have an insulating material covered by a shell.

The vapor plug 400 may contain a polymer top 420. The polymer top 420 may be adhered to the cork bottom 410 using an appropriate manner for strength, heat transfer, or industry practices. In various embodiments, the polymer top 420 may contain a circular plate 421. The circular plate 421 may have a radiused edge 423. The radiused edge 423 of the circular plate 421 extends curvedly downward from a circumferential edge of the circular plate 421. The radiused edge 423 may extend downward to a cylinder section, specifically a plate side wall 422. The plate side wall 422 may comprise a cylinder section, the radiused edge 423 may comprise a curved flange, and the circular plate 421 may comprise a planar feature so that a combination of the circular plate 421 in conjunction with the radiused edge 423 and the plate side wall 422 define a cap structure. In various embodiments, the cap structure is large enough to be able to cover the neck ring 202 (FIG. 4).

The polymer top 420 may comprise a pair of vapor plug handles 424. In various embodiments, more vapor plug handles 424 or fewer vapor plug handle(s) 424 may be included. A vapor plug handle 424 comprises one or more lever, attached to a portion of the polymer top 420. For instance, the vapor plug handle 424 may be a pair of levers attached to the plate side wall 422 and extending therefrom to permit an exertion of a bending moment on the plate side wall 422. For instance, the vapor plug handle 424 may have a pair of arms (levers) that cantilever away from the plate side wall 422. In response to manipulation of the vapor plug handle 424, the plate side wall 422 may be bendable. By bending the plate side wall 422, features of the polymer top 420 may be brought into and out of interfering relation with other features of the neck ring 202 (FIG. 4). In this manner, the vapor plug handle 424 may be manipulated to selectably release the vapor plug 400 (FIG. 1) from mechanical communication with the dewar 200 (FIG. 1).

The vapor plug 400 may have two vapor plug handles 424, each handle having a pair of arms (levers) which may be used to lift and insert the vapor plug 400 into the cryogenic storage vessel 100 (FIG. 1). When the vapor plug 400 is inserted into the cryogenic storage vessel 100 and locked onto the neck ring 202 (FIG. 2), the vapor plug handles 424 may be used to unlock and remove the vapor plug 400 from the neck ring 202 (FIG. 2). The two vapor plug handles 424 may be on opposing sides of the vapor plug 400, so that they are separated by 180 degrees in either direction around the vapor plug 400. In this manner, the vapor plug handles 424 may be squeezed into closer relation by a single human hand, causing the two handles to selectably release the vapor plug 400 (FIG. 1) from mechanical communication with the dewar 200 (FIG. 1).

Each vapor plug handle 424 may be connected to the polymer top 420. For instance, each vapor plug handle 424 may comprise one or more vertical radius arm 425. The vertical radius arms 425 may be another name for a portion of the levers mentioned previously. A vertical radius arm 425 comprises an arm connected to the plate side wall 422 and extending in a direction generally parallel a central longitudinal axis of the vapor plug 400. The vertical radius arm 425 may comprise an arm extending parallel to the plate side wall 422. The vertical radius arm 425 may comprise an arm extending toward the polymer top 420, and specifically, the circular plate 421.

Each vertical radius arm 425 may connect to another arm. For instance, each vapor plug handle 424 may also include one or more horizontal radius arm 426 connected to each vertical radius arm 425. The horizontal radius arm 426 may also be a portion of the previously mentioned levers. Thus, reference to a lever may refer to both a horizontal radius arm 426 and a vertical radius arm 425 connected to the horizontal radius arm 426.

A horizontal radius arm 426 may comprise an arm extending away from an end of the vertical radius arm 425 at an angle relative to the vertical radius arm 425. For instance, each horizontal radius arm 426 may join a vertical radius arm 425 at an end of the vertical radius arm 425 and extend perpendicularly away from the vertical radius arm 425. In this manner, the lever provided by the vertical radius arm 425 may be manipulated by a user grasping a portion of the handle for mechanical advantage, and also the handle may be kept in close proximity to the polymer top 420, to limit the risk of inadvertently catching on another item or taking up space unnecessarily. In various instances, the perpendicular joinder of the horizontal radius arm 426 and the vertical radius arm 425 is a curved joinder, having an arcuate transition from one direction to a perpendicular direction, such as from about parallel to the plate side wall 422 to about parallel to the circular plate 421.

Each vapor plug handle 424, vertical radius arm 425, and horizontal radius arm 426 may be fabricated using plastic, metal or composite. The two vapor plug handles 424 may each also contain a rib 427 extending between two horizontal radius arms 426 of the vapor plug handle 424 for gripping the two vapor plug handles 424. The rib 427 may be a member extending between the two horizontal radius arm 426 of the handle and providing a grasping surface.

The polymer top 420 may also comprise a flexible interference flange 502. A flexible interference flange 502 is a portion of the polymer top 420 that is bendable in response to manipulating of a vapor plug handle 424. The bendable aspect may move a feature of the vapor plug 400 into and out of interfering relation with a feature of the neck ring 202 (FIG. 2) to selectably engage the vapor plug 400 in retention to the base 203 (FIG. 2) or disengage the vapor plug 400 for removal from the base 203 (FIG. 2). The flexible interference flange 502 may be a U-shaped flange. The flexible interference flange 502 may be a portion of the plate side wall 422 that is partially separated from the remainder of the plate side wall 422 by a channel cut through the plate side wall 422 and/or other aspects of the polymer top 420 to facilitate enhanced flexibility of the partially separated portion. A vapor plug 400 may have two flexible interference flanges 502, each associated with a vapor plug handle 424 to manipulate the flexible interference flange 502. However, any number of flexible interference flanges 502 may be provided.

The partial separations may be channels defined through the polymer top 420, for instance, through the plate side wall 422. These channels may be termed slits. A vapor plug 400 may have outward slits 428 and inward slits 429. The outward slits 428 may comprise channels defined through the plate side wall 422 and located on the outside of the horizontal radius arms 426 of the two vapor plug handles 424. As used in this instance, outside may mean at positions around the circumference of the polymer top 420 and/or plate side wall 422, between which the flexible interference flange 502 is disposed. The inward slits 429 are located on the inside of the horizontal radius arms 426 of the two vapor plug handles 424. As used in this instance, inside may mean at positions between the outward slits 428. As used in this instance, inside may mean at positions between the outward slits 428 and spaced apart therefrom. As used in this instance, inside may mean at positions between the two vertical radius arms 425 (levers) associated with the flexible interference flange 502. Thus, for a U-shaped flexible interference flange 502, the inward slits 429 may define a smaller (shorter), inward and/or concave side of the U-shape, while the outward slits 428 may define a larger (longer), outward and/or convex side of the U-shape.

The outward slits 428 are cut into the polymer top 420 from an edge of the plate side wall 422 to a location on the polymer top 420. The distance of the cut on the outward slits 428 is determined by allowing enough flex of the polymer top 420 without compromising the structure of the polymer top 420. The inward slits 429 are cut to allow flex in conjunction with the outward slits 428 in the polymer top 420.

With reference to FIGS. 6 and 7, in example embodiments, the vapor plug 400 may comprise adhesive 414 to join the cork bottom 410 to the polymer top 420 using an appropriate manner for strength, heat transfer, or industry practices. In further embodiments, the vapor plug 400 comprises a polymer shell (e.g., a plastic skin) integral with or joined to the polymer top 420 and containing the cork bottom 410 therein. FIG. 6 also shows a detail view for the polymer top 420 and the neck ring 202 that can be referenced in FIG. 7.

With reference to FIGS. 6 and 7, in example embodiments, the neck ring 202 may comprise a cylindrical wall 302. Additionally, the neck ring 202 may comprise a guidance ramp 304. In an example embodiment, the cylindrical wall 302 and the guidance ramp 304 create an undercut 303. The undercut 303 may be configured to interlock with the lip 431 on the polymer top 420 when there is no compression force on the pair of vapor plug handles 424. The undercut 303 allows the polymer top 420 to be locked to the neck ring 202. In example embodiments, the cylindrical wall 302, the guidance ramp 304, and the undercut 303 are placed annularly around the neck ring 202.

The polymer top 420 may comprise a second guidance ramp 430. The second guidance ramp 430 may lead to a lip 431 that may be configured to allow the polymer top 420 to expand over the neck ring 202 using the second guidance ramp 430 and the guidance ramp 304 until the undercut 303 and the lip 431 make contact. The example embodiment may stay interlocked between the undercut 303 and the lip 431 until the user compresses the pair of vapor plug handles 424 and removes the vapor plug 400 from the dewar 200.

Referring now to the complete set of FIGS. 1-7, various examples of systems, devices, or methods provided herein may be discussed in specific detail. For example, a vapor plug locking mechanism including a neck ring 202 is provided. The neck ring 202 may include a cylindrical wall to encircle a neck 204 of a storage container. The cylindrical wall is receivable onto the neck 204 of the storage container. The neck ring 202 may also include a protruding annular boss extending radially outwardly from the cylindrical wall and defining a discontinuous edge configured to be selectably engaged with a vapor plug 400. The vapor plug locking mechanism may include a vapor plug 400 insertable into the neck 204 of the storage container. The vapor plug 400 may include a flexible interference flange 502 that is bendable in response to manipulation of a vapor plug handle 424. The flexible interference flange 502 may include a lip 431 extending radially inwardly from the vapor plug 400 toward a center of the cylindrical wall of the neck ring 202 to selectably engage with the discontinuous edge of the protruding annular boss of the neck ring 202.

In various embodiments, the cylindrical wall of the neck ring 202 includes a cylindrical wall 302 encircling the neck 204 and a guidance ramp 304. The guidance ramp 304 may include a cantilevered inclined plane disposed annularly about at least a portion of the cylindrical wall 302 and extending away from the cylindrical wall 302 to provide the protruding annular boss an undercut 303 space between the cylindrical wall 302 and the cantilevered inclined plane.

The vapor plug 400 may include a plate side wall 422 having a cylindrical flange positionable radially outward of and encircling the neck ring 202 (and specifically, the cylindrical wall 302). The flexible interference flange 502 may be a portion of the cylindrical flange. Thus, the flexible interference flange 502 may be a portion of the plate side wall 422. A further flexible interference flange 502 may be disposed opposite the flexible interference flange 502, separated 180 degrees from the flexible interference flange 502 along the plate side wall 422. The flexible interference flange 502 may include a lip 431 engageable against the protruding annular boss and extending at least partially into the undercut 303 space to selectably retain the vapor plug 400 insertably in the neck 204 by an interference fit of the lip 431 against the protruding annular boss. In various embodiments, the lip 431 includes a protrusion extending annularly from the flexible interference flange 502 inwardly toward a central longitudinal axis of the flexible interference flange 502. In various embodiments, the lip 431 includes an inwardly extending boss extending from the flexible interference flange 502 to selectably engage with the protruding annular boss to selectably retain the vapor plug 400 insertably in the neck 204.

The flexible interference flange 502 may have a vapor plug handle 424 cantilevered from the flexible interference flange 502 to manipulate the flexible interference flange 502 to selectably disengage the inwardly extending boss from the protruding annular boss. The vapor plug handle 424 may include a vertical radius arm 425 cantilevered from a radially outward surface of the plate side wall 422 and extending parallel to a central longitudinal axis of the vapor plug 400. The vertical radius arm 425 connects to a horizontal radius arm 426 extending perpendicularly from the vertical radius arm 425. The perpendicularly extending horizontal radius arm 426 may have a curved end connecting to the vertical radius arm 425. In various embodiments, the flexible interference flange 502 is U-shaped.

The locking collar may include a ledge 305. The ledge 305 may be a boss having a cross-sectional profile matching that of an end of the neck 204 and positionable atop the end of the neck 204. The ledge 305 may provide an abutting face that abuts a portion of the vapor plug 400. The locking collar may include a channel 306 defined through the ledge 305 and configured to receive a wire for passage from inside the vessel, past the vapor plug 400, and out of the vessel when the vapor plug 400 is installed in place.

A cryogenic storage vessel 100 is provided. The vessel may include a dewar 200. The vessel may include a vapor plug 400 insertable into a neck 204 of the dewar 200 to at least partially seal the dewar 200. The dewar 200 may include a neck ring 202 having a cylindrical wall and a protruding annular boss. The cylindrical wall may encircle a neck 204 of the dewar 200 container, wherein the cylindrical wall is receivable onto the neck 204 of the dewar 200. The protruding annular boss may extend radially outwardly from the cylindrical wall and define a discontinuous edge configured to be selectably engaged with the vapor plug 400. The vapor plug 400 may include a flexible interference flange 502 that is bendable in response to manipulation of a vapor plug handle 424. The flexible interference flange 502 may have a lip 431 extending radially inwardly from the vapor plug 400 toward a center of the cylindrical wall of the neck ring 202 to selectably engage with the discontinuous edge of the protruding annular boss of the neck ring 202.

The vapor plug 400 may have a plate side wall 422 including a cylindrical flange positionable radially outward of and encircling the neck ring 202, the flexible interference flange 502 may be a portion of the cylindrical flange. A further flexible interference flange 502 may be disposed opposite the flexible interference flange 502, separated 180 degrees from the flexible interference flange 502 along the plate side wall 422. In various embodiments, the flexible interference flange 502 includes a lip 431 engageable against the protruding annular boss and extending at least partially into the undercut 303 space to selectably retain the vapor plug 400 insertably in the neck 204 by an interference fit of the lip 431 against the protruding annular boss. The lip 431 may be an inwardly extending boss extending from the flexible interference flange 502 to selectably engage with the protruding annular boss to selectably retain the vapor plug 400 insertably in the neck 204.

In various embodiments, a vapor plug locking mechanism is provided. The vapor plug locking mechanism may include a first annular, horizontal flange, the first annular, horizontal flange having an undercut 303 used to interlock with a second annular, horizontal flange. The mechanism may include a cryogenic storage vessel 100 having a neck 204 and a neck ring 202 around the neck 204, the neck ring 202 having the second annular, horizontal flange. The first annular, horizontal flange may be configured to receive the second annular, horizontal flange in an interlocking fashion.

The vapor plug locking mechanism may have other aspects. For instance, in various embodiments, the first annular, horizontal flange extends radially inward from an outer rim of the vapor plug locking mechanism. In various embodiments, the second annular, horizontal flange extends radially outward from the neck ring 202. The neck ring 202 may have an annular tapered ramp leading to the second annular, horizontal flange. The annular tapered ramp may be configured so that the neck ring 202 increases in dimension closer to the second annular, horizontal flange and decreases in dimension closer to the opening of the neck ring 202. The vapor plug 400 may further include a gasket, the gasket configured to selectively seal the vapor plug 400 to a neck 204 of the cryogenic storage vessel 100. The vapor plug 400 may further include a pair of vapor plug handles 424. The pair of vapor plug handles 424 may allow flex in the vapor plug 400 to allow the first annular, horizontal flange to detach from the second annular, horizontal flange. The vapor plug 400 may further include a cork base disposed adjacent to the pair of vapor plug handles 424, the cork base configured to center the vapor plug 400 in the cryogenic storage vessel 100 and assist with insulating the vapor plug 400. The vapor plug 400 may also have a channel in the cork base, the channel in the cork base configured to allow electrical connections to be routed to the cryogenic storage vessel 100 without being compressed by the cork bottom 410.

A vapor plug locking mechanism is provided. The mechanism may include a cryogenic storage vessel 100 configured to contain a material below an ambient temperature. The mechanism may include a neck 204 of the cryogenic storage vessel 100 having a neck ring 202. The mechanism may include a second annular, horizontal flange extending radially outward from the neck ring 202. The mechanism may include a vapor plug 400 having a first annular, horizontal flange extending radially inward from an outer rim of the vapor plug locking mechanism that is configured to interlock with the second annular, horizontal flange.

One or more further aspects may be provided. For example, the vapor plug 400 may include a channel in the neck ring 202, the channel in the neck ring 202 configured to allow electrical connections to be routed to the cryogenic storage vessel 100 without being compressed by the vapor plug 400. The vapor plug 400 may include a pair of vapor plug handles 424. The pair of vapor plug handles 424 may be configured to allow flex in the vapor plug to allow the first annular, horizontal flange to detach from the second annular, horizontal flange. The cryogenic storage vessel 100 may further include an external electronics housing. The external electronics housing may include a wireway 412 exit.

A method may be provided for securing a cryogenic storage vessel 100. The method may include placing a vapor plug 400 onto the cryogenic storage vessel 100 having a neck ring 202. The method may include inserting the vapor plug 400 onto the neck ring 202 of the cryogenic storage vessel 100 until the neck ring 202 and the vapor plug 400 interlock. The method may further include sealing the vapor plug 400 to the cryogenic storage vessel 100. The method may include releasing gas from the cryogenic storage vessel 100. The method may include releasing the vapor plug 400 by applying a compression force to a pair of vapor plug handles 424 disposed atop the vapor plug 400 so that the pair of vapor plug handles 424 are distantly closer to each other. The method may include removing the vapor plug 400 by pulling the vapor plug 400 upward while simultaneously compressing the pair of vapor plug handles 424. The compressing the handles may bend a feature of the vapor plug 400 to disengage the interlocking of the vapor plug 400 and the neck ring 202.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

The invention claimed is:

1. A vapor plug locking mechanism comprising:

a neck ring comprising:

a cylindrical wall receivable onto a neck of a storage container;

a protruding annular boss extending radially outwardly from the cylindrical wall and defining a discontinuous edge configured to be selectably engaged with a vapor plug; and the vapor plug insertable into the neck of the storage container and comprising:

a flexible interference flange that is bendable in response to manipulation of a handle, the flexible interference flange comprising a lip extending radially inwardly from the vapor plug toward a center of the cylindrical wall of the neck ring to selectably engage with the discontinuous edge of the protruding annular boss of the neck ring, wherein the flexible interference flange comprises a handle cantilevered from the flexible interference flange to manipulate the flexible interference flange to selectably disengage the inwardly extending boss from the protruding annular boss, wherein the handle comprises a vertical radius arm cantilevered from the flexible interference flange and extending parallel to a central longitudinal axis of the vapor plug, wherein the vertical radius arm includes a curved end, wherein the curved end connects to a horizontal radius arm extending perpendicularly from the vertical radius arm toward the center of the cylindrical wall of the neck ring.

2. The vapor plug locking mechanism of claim 1, wherein the cylindrical wall of the neck ring encircles the neck.

3. The vapor plug locking mechanism of claim 2, wherein the protruding annular boss includes a guidance ramp comprising a cantilevered inclined plane disposed annularly about at least a portion of the cylindrical wall and extending away from the cylindrical wall and defining an undercut space between the cylindrical wall and the guidance ramp of the protruding annular boss.

4. The vapor plug locking mechanism of claim 3, wherein the vapor plug comprises a plate side wall comprising a cylindrical flange positionable radially outward of and encircling the neck ring.

5. The vapor plug locking mechanism of claim 4, wherein the flexible interference flange comprises the lip engageable against the protruding annular boss and extending at least partially into the undercut space to selectably retain the vapor plug insertably in the neck by an interference fit of the lip against the protruding annular boss.

6. The vapor plug locking mechanism according to claim 5, wherein the lip is a protrusion extending annularly from the flexible interference flange inwardly toward a central longitudinal axis of the vapor plug.

7. The vapor plug locking mechanism according to claim 5, wherein the lip is an inwardly extending boss extending from the flexible interference flange to selectably engage with the protruding annular boss to selectably retain the vapor plug insertably in the neck.

8. The vapor plug locking mechanism according to claim 1, wherein the flexible interference flange is U-shaped.

9. The vapor plug locking mechanism according to claim 1, wherein the neck ring comprises a ledge, the ledge comprising a boss having a cross-sectional profile matching that of an end of the neck and positionable atop the end of the neck.

10. The vapor plug locking mechanism according to claim 9, wherein the ledge provides an abutting face that abuts a portion of the vapor plug.

11. The vapor plug locking mechanism according to claim 9, wherein the neck ring includes a channel defined through the ledge and configured to receive a wire for passage from inside the storage container, past the vapor plug, and out of the storage container when the vapor plug is installed in place.

12. A cryogenic storage vessel system comprising:

a dewar; and a vapor plug insertable into a neck of the dewar to at least partially seal the dewar, wherein the dewar comprises a neck ring comprising:

a cylindrical wall to encircle the neck of the dewar, wherein the cylindrical wall is receivable onto the neck of the dewar; and a protruding annular boss extending radially outwardly from the cylindrical wall and defining a discontinuous edge configured to be selectably engaged with the vapor plug;

wherein the vapor plug comprises:

a flexible interference flange that is bendable in response to manipulation of a handle, the flexible interference flange comprising a lip extending radially inwardly from the vapor plug toward a center of the cylindrical wall of the neck ring to selectably engage with the discontinuous edge of the protruding annular boss of the neck ring, wherein the handle is curved over the vapor plug toward a center of the cylindrical wall.

13. The cryogenic storage vessel system of claim 12, wherein the vapor plug comprises a plate side wall comprising a cylindrical flange positionable radially outward of and encircling the neck ring, the flexible interference flange comprising a portion of the cylindrical flange.

14. The cryogenic storage vessel system of claim 13, wherein a further flexible interference flange is disposed opposite the flexible interference flange, separated from the flexible interference flange along the plate side wall.

15. The cryogenic storage vessel system of claim 14, wherein the flexible interference flange comprises the lip engageable against the protruding annular boss and extending at least partially into an undercut space to selectably retain the vapor plug insertably in the neck of the dewar by an interference fit of the lip against the protruding annular boss.

16. The cryogenic storage vessel system according to claim 15, wherein the lip comprises an inwardly extending boss extending from the flexible interference flange to selectably engage with the protruding annular boss to selectably retain the vapor plug insertably in the neck.

17. A vapor plug apparatus comprising:

a flexible interference flange that is bendable in response to manipulation of a handle, the flexible interference flange comprising a lip extending radially inwardly from the vapor plug apparatus toward a center of a cylindrical wall of a neck ring of a dewar to selectably engage with a discontinuous edge of a protruding annular boss of the neck ring of the dewar, the lip selectably engageable against the protruding annular boss of the neck ring of the dewar and extending at least partially into an undercut to selectably retain the vapor plug apparatus insertably in the neck ring of the dewar by an interference fit of the lip against the protruding annular boss;

the neck ring of the dewar, the neck ring comprising a guidance ramp disposed adjacent to the lip to allow the vapor plug apparatus to selectably engage with the neck ring of the dewar;

a further flexible interference flange is disposed opposite the flexible interference flange, separated from the flexible interference flange; and a handle cantilevered from the flexible interference flange to manipulate the flexible interference flange to selectably disengage the lip from the protruding annular boss, wherein the handle comprises a vertical radius arm cantilevered from a radially outward surface of a plate side wall of the vapor plug apparatus and extending parallel to a central longitudinal axis of the vapor plug apparatus, and wherein the vertical radius arm includes a curved end that connects to a horizontal radius arm extending perpendicularly from the vertical radius arm radially inwardly from the vapor plug apparatus toward the center of the cylindrical wall of the neck ring of the dewar.

* * * * *